Oct. 27, 1964    E. S. KRESS    3,154,301
SUSPENSION DEVICE
Filed Feb. 26, 1962    4 Sheets-Sheet 1

INVENTOR:
EDWARD S. KRESS
BY John F. Schmidt

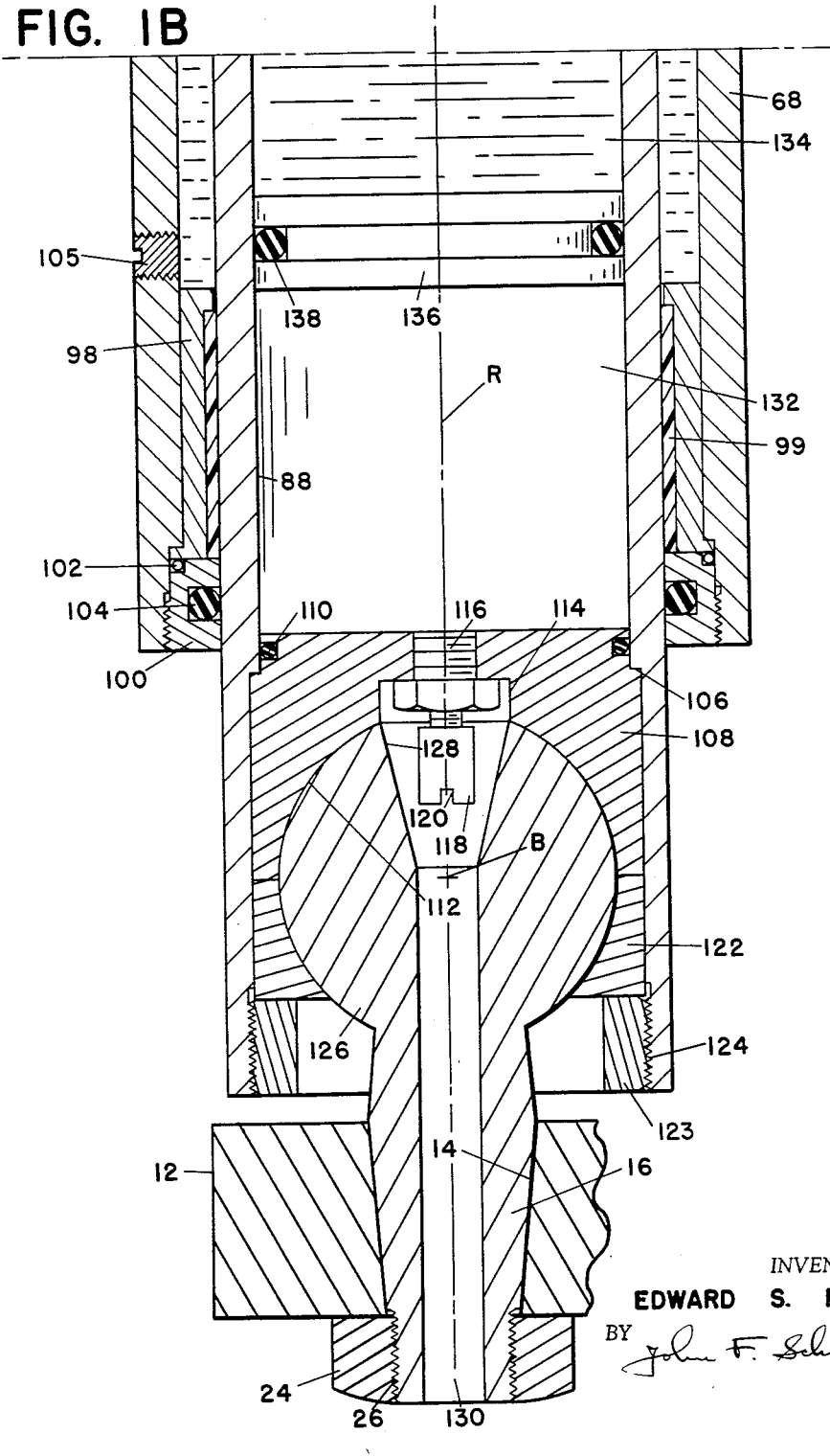

Oct. 27, 1964 E. S. KRESS 3,154,301
SUSPENSION DEVICE
Filed Feb. 26, 1962 4 Sheets-Sheet 3

INVENTOR:
EDWARD S. KRESS
BY John F. Schmidt

Oct. 27, 1964     E. S. KRESS     3,154,301
SUSPENSION DEVICE

Filed Feb. 26, 1962     4 Sheets-Sheet 4

INVENTOR:
EDWARD S. KRESS
BY John F. Schmidt

United States Patent Office 3,154,301  
Patented Oct. 27, 1964

3,154,301  
SUSPENSION DEVICE  
Edward S. Kress, Peoria, Ill., assignor to Kress Automotive Engineering, Peoria, Ill., a partnership  
Filed Feb. 26, 1962, Ser. No. 175,758  
18 Claims. (Cl. 267—64)

This invention relates to vehicles, and especially to a suspension system for vehicles, and is a continuation-in-part of my application Ser. No. 98,495, filed March 27, 1961.

Wheeled vehicles have developed for years about suspension systems utilizing steel springs. A study of vehicle design would appear to indicate a wide-spread assumption by designers that only stressed metal could be relied on to absorb the shocks of road irregularities while carrying whatever load the vehicle was designed for. While metal springs generally served the purpose, they always brought with them a number of problems which in turn saw the development of numerous attempts at solutions.

One problem inherent in metal springs is impact and rebound shock, and so-called "shock absorbers" have been developed to bring such shock under sufficient control to make suspension systems tolerable under the varying road conditions that vehicles are likely to encounter. In the circumstances, shock absorbers for metal suspension devices are "extras"—i.e., auxiliaries which must be added to an already cumbersome design.

Another problem inherent in metal spring suspensions is the very large bulk and weight involved in such suspensions as the loads they must carry keep increasing in size. What has happened is that, in large and heavily loaded vehicles, any metal spring that is resilient enough to give satisfactory "ride" characteristics turns out to be so large and so heavy that such a spring becomes ridiculous; the end result is a metal spring of manageable physical proportions, but which because of the large load must be so stiff as to be a "spring" in name only.

One very practical solution to the problem involves a complete departure from tradition, in which the concept of elastic deformation of metal is abandoned in favor of a device that utilizes the characteristics of fluids, liquid and gaseous, to provide the resilience desired and at the same time provide integral means to control shock, initial or impact shock, and rebound shock. Examples of such devices are given in U.S. Patents Nos. 2,914,337 and 2,914,338 to R. H. Kress, issued November 24, 1959.

It is accordingly an object of this invention to provide an oleopneumatic suspension device which avoids the disadvantages of metal springs in providing a soft ride with a minimum of apparatus weight and bulk, and which provides integral control of the motion due to impact and the motion on rebound. Other objects will be apparent to those skilled in the art.

Figure 1A:
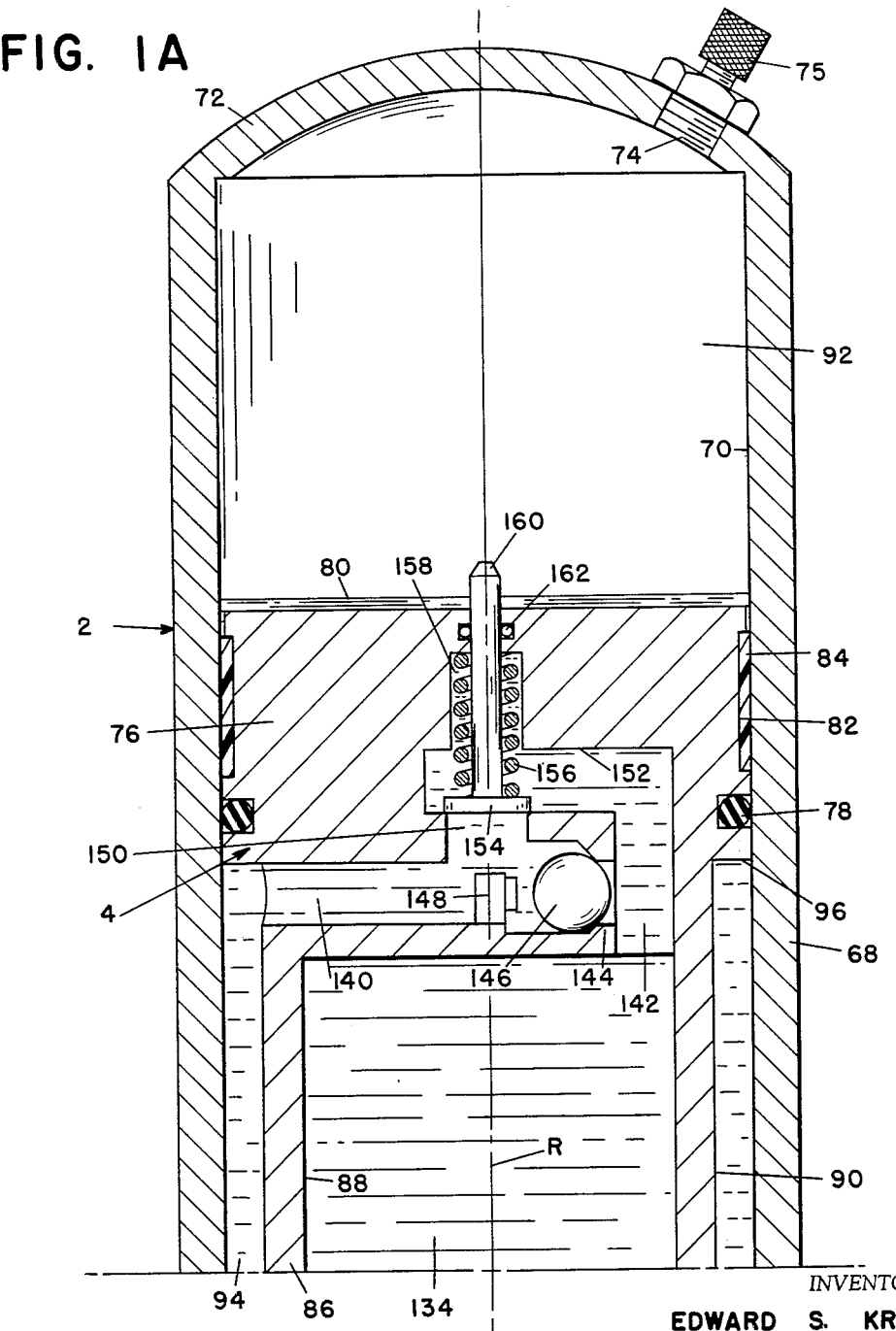
FIGURE 1 is a longitudinal view in section through an oleopneumatic suspension device of this invention, being a section substantially through the reciprocation axis and being in two parts, FIGURE 1A and FIGURE 1B, in order to show details on a scale large enough to facilitate illustration and description of the invention.

It will of course be understood that a suspension device of the type disclosed and claimed here can be used in a vehicle having any suitable basic supporting structure, of which the details need not be disclosed in this application. The term "basic supporting structure" is used as being more generic than the term "frame," because there are vehicles which are built on a "unit construction" basis, in which the body and frame are integral parts of a single structure, and there is no separately identifiable "frame" as such. An early example of such "unit construction" is the Nash passenger automobile of recent years.

A suspension device made according to this invention comprises a cylinder assembly 2 and a piston assembly 4. One assembly is secured to the basic supporting structure of the vehicle, and the other assembly is mounted to be carried by a wheel. Thus, in the embodiment shown here, the cylinder assembly 2 may be secured to the basic supporting structure in any suitable manner, and piston assembly 4 is secured to its adjacent wheel by means of a suspension anchor, the end of which is shown at 12. For this purpose, end 16 of the suspension device passes through an opening 14 in anchor end 12. A nut 24 engages threads 26 on end 16 to hold the parts together.

Cylinder assembly 2 and piston assembly 4 have common or coincident longitudinal axes which for convenience may be called the reciprocation axis of the suspension device; the reciprocation axis is shown at R. As will be understood by those skilled in the art of expansible chamber devices of the piston-and-cylinder type, axis R is the axis along which the piston assembly reciprocates in the bore of the cylinder assembly.

Reference will now be made to FIGURE 1A for a detailed description of the cylinder assembly 2, wherein a cylindrical element 68 is shown provided with a bore 70 which can be referred to as the cylinder bore to distinguish it from the piston rod bore to be described later.

A head 72 may be bolted to the cylinder 68, it may be screwed on, or it may be welded to the cylinder 68; as here shown, cylinder 68 and head 72 are one piece. Head 72 forms a closure for the upper end of bore 70 and is apertured to receive a charging valve 74. A screw-on cap 75 protects and seals the exposed part of the valve. Valve 74 may be any suitable check valve arranged to permit fluid flow into the cylinder and manually releasable to permit fluid flow out of the cylinder.

The piston assembly 4 referred to above is reciprocable in bore 70 along a reciprocation axis R. In the embodiment shown in FIGURE 1A, a cylindrical piston element 76 is grooved to receive an O-ring 78. An oil film 80 is carried at the top of the piston. A shallow groove 82 in the piston is provided to receive a bearing sleeve 84 which is preferably made of Synthane plastic.

A piston rod 86 having an internal bore 88 is secured to the piston in any suitable manner. As here shown, the rod and the piston are integral. The external surface 90 of the piston rod is spaced from cylinder bore 70. The space is the cylinder above the piston may be referred to as a head chamber 92, and another chamber 94 is formed by the annular space below the lower surface 96 and between the bore 70 and external surface 90 of the piston rod 86. The annular chamber 94 is closed at its lower end by a lower end closure forming part of the cylinder assembly, the end closure comprising a sleeve 98 (FIGURE 1B), a Synthane plastic bearing sleeve 99, and a threaded ring 100 suitably packed as shown at 102 and 104. Charging access to chamber 94 is provided by a plug 105.

Reference was made to piston rod bore 88. Bore 88 is closed at its upper end by piston element 76 and valves to be described below, and at its lower end by a rod closure. As can be seen in FIGURE 1B, the lower end of bore 88 is stepped to form a shoulder 106. A rod closure 108 is similarly shaped to fit the stepped bore and is suitably packed as shown at 110. Rod closure 108 is spherically recessed at 112, and the spherical surface is further recessed by a counterbore 114 which is centrally apertured to receive a charging check valve 116 similar to valve 74 in the cylinder head. A cap 118 protects the valve and provides a seal, the cap being slotted at 120 for application and removal by means of a screw driver.

Closure 108 forms half of the socket of a universal movement type of joint, here shown as a ball-and-socket joint having a center B, used to connect the piston assembly with the axle by way of anchor end 12. Thus, the other half of the socket is an annulus 122 which is held in place by a nut 123; nut 123 engages cooperating threads in the rod end as shown at 124. The socket formed by the two parts 108 and 122 receives a ball 126 which carries the end 16 referred to above and threaded at 26 to receive nut 24.

The cap end of charging valve 116 extends into the spherical cavity of closure 108, and ball 126 is provided with a recess 128 to receive the protruding valve and its cap, recess 128 being large enough to permit the necessary angular movement of the end 16 relative to reciprocation axis R. The stem or end 16 and part of ball 126 are provided with a bore 130 which is coaxial and connects with recess 128 to permit the use of a tool such as a screw driver to remove and apply cap 118.

The closure in the lower end of rod bore 88 effectively seals said lower end against fluid leaks. The space in the rod bore is divided into a first shock control or rod chamber 132 and a second shock control or rod chamber 134 by a wall or membrane 136 which is movable to vary the volume of the respective rod chambers. As here shown, the membrane is a floating piston reciprocable in rod bore 88, being packed as shown at 138 to seal the two rod chambers from each other.

Mention was made above of the need, or at least desirability, of shock control characteristics in suspension devices, and of the fact that shock control in conventional devices is accomplished by apparatus added to the suspension devices, whereas in devices of the type here disclosed and claimed, such control can be accomplished by means formed integral with the suspension device.

The annular chamber 94 and the two rod chambers 132 and 134 cooperate to provide the shock control referred to. Thus, first fluid conduit means are provided to connect the annular chamber with the second rod chamber, with an unbiased check valve arranged to permit fluid to flow only from the second rod chamber to the annular chamber. In the embodiment shown in FIGURE 1A, a transverse passage 140 in piston element 76 connects at one end with the upper part of annular chamber 94, and at its other end with an axial passage 142 in element 76. A valve seat-providing element 144 carries a ball 146 adapted to engage the seat of element 144 to prevent fluid flow from the annular chamber to the second rod chamber. A stop 148 limits the movement of ball 146 in the passage-open direction.

Second fluid conduit means are provided connecting the second rod chamber and the annular chamber, and a check valve in the second fluid conduit means is biased against flow from the annular chamber to the second rod chamber and seats to prevent flow in the opposite direction. In FIGURE 1A, an axial passage 150 in element 76 connects at its lower end with passage 140 and at its upper end with a transverse passage 152, the latter connecting also with axial passage 142. At the intersection of passages 150 and 152, a valve seat is provided to cooperate with a check valve element 154 to seal the second fluid conduit means against flow from the second rod chamber to the annular chamber. Flow in the opposite direction is opposed by the bias of a spring 156 which bears at its lower end against the upper surface of element 154 and at its upper end against the end of a counterbore 158.

A stem 160 is secured to the upper surface of element 154 and extends through an opening in piston element 76 into the head chamber 92. The stem is suitably packed as at 162 to seal the opening against leakage.

Reference was made above to an unbiased check valve. The object of such a check valve is a minimum resistance to fluid flow in the permitted direction. Even though a light spring may be used in some cases to insure seating of the ball, the spring force is so slight by comparison with the force of fluid against the spring that, for all practical purposes, the ball may be described as unbiased.

Figure 2:
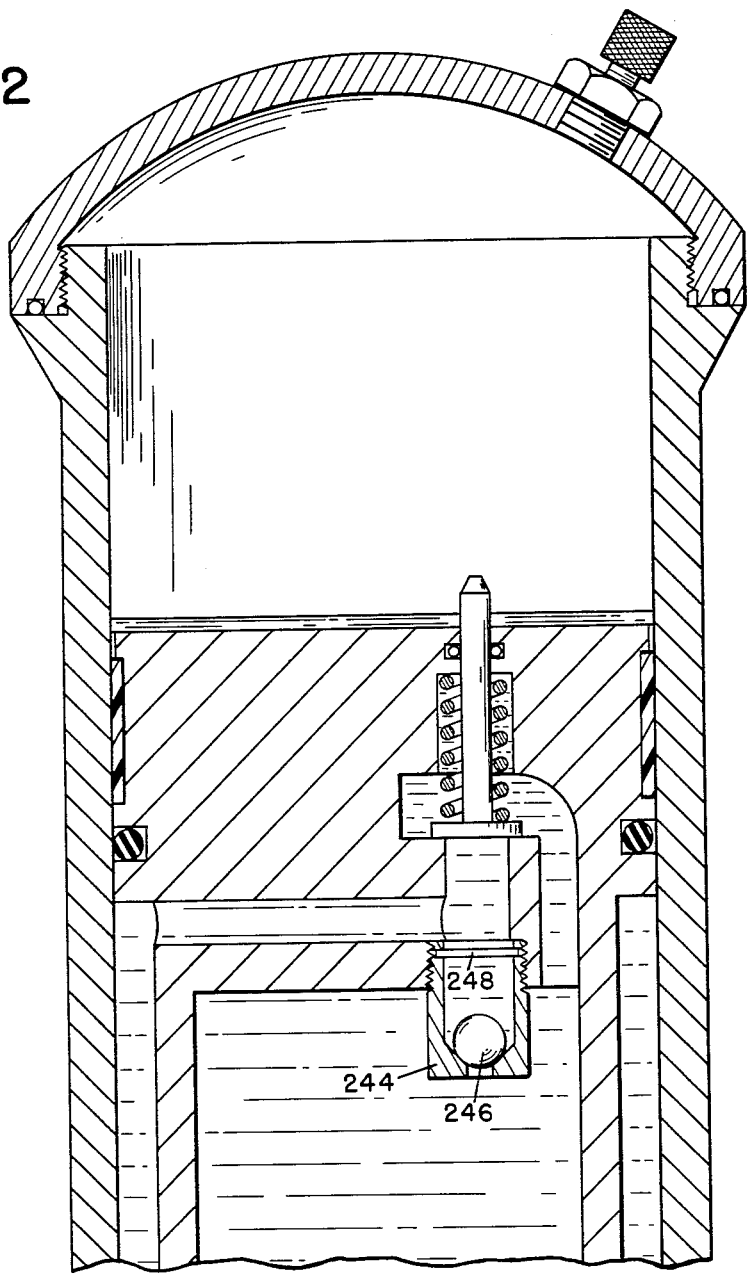
FIGURE 2 shows another embodiment of the integral shock control means shown in FIGURE 1A.

Another embodiment of the shock control means is shown in FIGURE 2, wherein the valve seat-providing element 244 is arranged with its axis vertical instead of horizontal. Ball 246 thus moves upward to open the passage to fluid flow. Even though, in this embodiment, the weight of the ball serves to bias the ball into the valve-closed position, that weight is small compared with the fluid pressure upward which unseats the ball. A pin 248 assures that ball 246 will always be in position to engage its seat.

Figure 3:
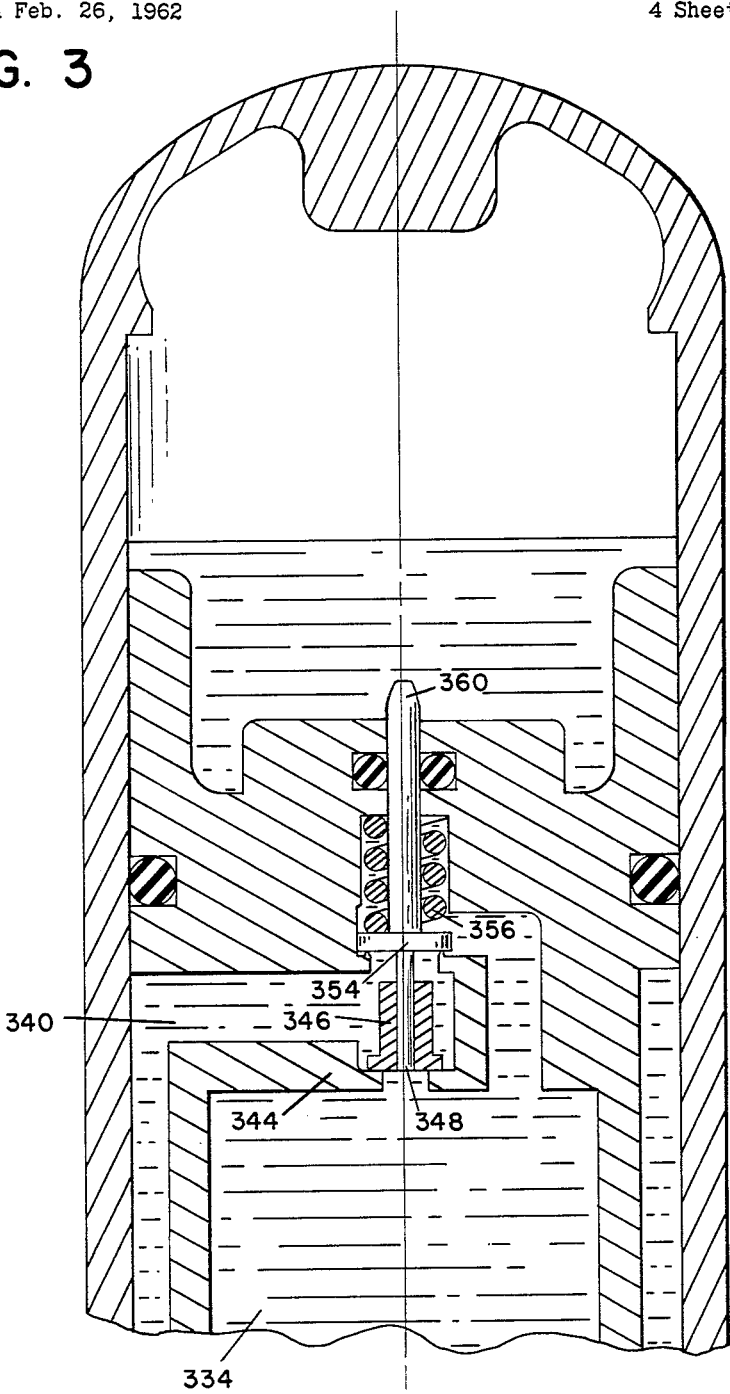
FIGURE 3 shows still another embodiment of the integral shock control means, being a view similar to FIGURE 2.

Still another embodiment is shown in FIGURE 3, wherein a valve seat 344 is disposed between the second rod chamber 334 and passage 340. An unbiased check valve element 346 is movable into and out of engagement with the seat 344 on a guide 348 which, in the embodiment shown, takes the form of a rod on the underside of valve element 354. Check valve element 346 is provided with a substantially central bore to receive guide 348 and to provide for vertical movement of element 346—i.e., vertical in the embodiment shown in FIGURE 3.

As in FIGURE 1A, check valve 354 is biased into its illustrated closed position by a spring 356 and by fluid pressure acting on the upper end of a rod 360. Rod 360 and guide 348 have parallel, and preferably coincident, axes so that either element 346 or element 354 can open and close independently of the other.

Valve element 346 is described above as being unbiased. In the orientation shown, the weight of element 346 tends to hold the element against its seat. However, element 346 is immersed in oil, and can be made of a material having a low specific gravity, or can be hollow, if desired, to reduce its effective weight to the extent that element 346 is unbiased for all practical purposes. Moreover, when the forces due to fluid pressure are considered in relation to weight, element 346 can be considered as being unbiased even if it be made of a high specific gravity material.

*Operation*

The several chambers are charged to the necessary pressures according to the loads to be carried. What these pressures should be will be computed in each case and need not be set forth here. Referring to FIGURE 1A, it will suffice here to state that head chamber 92 and first rod chamber 132 are charged with a relatively inert, dry gas such as nitrogen which is of course a compressible fluid. Annular chamber 94 and second rod chamber 134 are charged with an incompressible fluid such as oil.

The load (payload plus tare) is supported by the fluid under pressure in head chamber 92. It should be noted that the pressure in annular chamber 94 opposes the pressure in chamber 92. It will moreover be noted that the pressure in the rod chambers will normally not be greater than the pressure in annular chamber 94 because of unbiased check valve 144–146, although the rod chamber pressure can be and sometimes is less than the pressure in annular chamber 94. It will be observed that the pressure in rod chambers 132 and 134 will be substantially equal because membrane 136 is readily movable in response to pressure differences, and because the weight and inertia of membrane 136 and the static head in chamber 134 are usually negligible in view of the comparatively high fluid pressures to which the chambers are charged.

Let it be supposed now that the vehicle wheel associated with the device of FIGURE 1 strikes a bump. The relatively large inertia of the load will cause piston assembly 4 to move upward in the bore 70, compressing the elastic fluid in the head chamber 92. Such upward movement of the piston effects an increase in volume of annular chamber 94, occupied by an incompressible and quite inelastic fluid. The pressure throughout the annular chamber and in transverse passage 140 drops, whereupon the (then) greater pressure in rod chambers 132 and 134 causes oil to move through check valve 144–146 to keep the annular chamber full of oil. Membrane 136 moves upward under the influence of the compressible fluid in chamber 132.

If the bump is short in the direction of motion, the parts will not have time to re-establish equilibrium conditions. As the wheel rides off the bump, the piston assembly tries to move down in cylinder bore 70 under the influence of the pressure in head chamber 92. Such movement can only be accomplished by decreasing the volume in annular chamber 94. However, since the fluid in chamber 94 is incompressible, the piston assembly cannot move down without displacing some of the fluid from chamber 94.

Ball 146 is now held securely against its seat, so oil cannot flow into chamber 134 through the unbiased check valve. If there is to be any flow of oil, it must be through passage 150, and element 154 must be unseated to permit such flow. Element 154 is held seated by the force exerted by preloaded spring 156, by the pressure in rod chamber 134 acting on the upper surface of element 154, and by the pressure in head chamber 92 acting on stem 160. The force to unseat element 154 comes from the pressure in annular chamber 94, and that force is of course the product of that pressure and the area of element 154 which is exposed to the pressure.

It must be remembered that the pressure in head chamber 92 is quite high because of the upward movement of the piston due to the bump, as just described. There is accordingly an extra "push" being exerted on the upper surface of the piston, and this extra force causes the pressure in annular chamber 94 to build up rapidly to a value sufficient to overcome the forces which are trying to hold element 154 seated. Accordingly, the pressure under element 154 rapidly increases to a value sufficient to unseat the valve element.

At this point in the discussion, it is well to review what was said earlier regarding inherent shock control. Suspension devices of the type which rely on the elastic deformation of metal are faced with a problem called "bottoming" or "hitting bottom," wherein, because of the practicality constant spring rate, the frame or a portion of the body deflects a maximum and strikes a portion of the unsprung wheel mounting means or even the wheel itself, as for example where the underside of a fender comes down onto the tire. At the other extreme, the vehicle may bounce up so far that the wheel leaves the road. Various measures are employed to overcome these difficulties, such as "helper" springs, shock absorbers which are auxiliaries to the metal springs, and the like. In the end, all or nearly all suspensions of that type for heavy trucks are forced to rely on springs which are so stiff that they cannot "bottom"; such springs, however, are so stiff that they deflect very little and consequently gives a very jouncy or rough ride, and hence the expression "rides like a truck."

Suspensions of the type here disclosed and claimed are equipped with inherent shock control devices. Thus, where impact moves the piston upward in the cylinder bore, the shock of impact is absorbed by compression of the gas in chamber 92. Moreover, the shock of bottoming is avoided by the nature of compressed gas. Because $P_1V_1=P_2V_2$, as the piston approaches the upper end of the cylinder bore and the volume becomes very small, the pressure increases greatly and with it, the resistance to further upward movement.

As the wheel moves off the bump, oil is moved out of annular chamber 94 into rod chamber 134, compressing the gas in rod chamber 132 and cushioning the rebound shock.

Reference will now be made to still another phenomenon of spring suspension requiring shock control. Let a soft coil spring be hung from a hook and a weight be hung on the spring; assume that the weight is light enough to avoid stretching the spring beyond its elastic limit, but is heavy enough to effect appreciable elastic deformation. If the system is in equilibrium, it can be caused to vibrate either by pushing up on the weight or by pushing down on it. The system will again come to rest if let alone, the amplitude of the vibrations diminishing gradually. The system can be brought to rest also by connecting a vibration damper or "shock absorber" to it. If the undamped system with its vibrating weight be looked upon as an elastic ball dropped from a considerable height onto a hard floor, the weight can be described as "bouncing." Its first cycle of such motion is the first "bounce," and thereafter the weight "rebounds" a number of times. The number of "rebounds" can be brought under close control by attaching a damping device to the system, in which case the damping device becomes a rebound control means. As used in the claims in this case, the term "rebound control" has the meaning described above in the example of the vibrating weight.

Let the simple weight-and-spring system referred to above now be subjected to a continuing disturbing influence, as opposed to a single or isolated "push" on the weight. If the continuing disturbance constitutes a succession of equally spaced (in time) impulses, it will be understood that such impulses could be applied to the system at a frequency in tune with the resonant or natural frequency of the system, in which case the amplitude of the vibrations would quickly increase to several times the amplitude resulting from a single and isolated push on the weight.

Vehicle wheel suspension devices function very much like the foregoing example. A vehicle moving along a good paved highway encounters an object lying in the path of one of the wheels. The wheel strikes the object and runs over it, even as a single isolated push is applied to the suspended weight of the example. As in the example, the vehicle and its load bounce on the spring of the wheel in question, then rebound, over and over again unless a damper, or rebound control device, is applied to the wheel suspension system.

Let it now be assumed that, instead of a good paved road, the vehicle negotiates a section of "improved country road" and encounters a stretch of "washboard" road, where more or less equally spaced depressions apply a rapid succession of blows to the wheel. In most cases, within the normal operating speed limits of the vehicle, there will be one or more speeds which, for the given spacing of depressions, will cause vibration of the wheel at the natural frequency of the spring system. Such operation at resonant frequency could quickly cause the wheel suspension to reach one end or the other of its stroke, with the resultant shock to the load (and operator), and damage to the equipment. Although one such incident is not likely to hurt the operator or damage the load or the vehicle, it must be remembered that such incidents are multiplied by time and distance, resulting in undue operator fatigue and over-frequent breakdowns in equipment.

Turning again to the structure here shown in FIGURE 1A, there is virtually no damping effect on the piston upstroke. However, as the piston attempts to "bounce back" or rebound, free elastic movement is prevented by the element 154 which is responsive to three fluid pressures as aforesaid. Thus, the rebound is effectively controlled on the very first stroke.

I have found that it is desirable to keep the rebound control, or damping, force a nearly constant percentage of the load. This point is probably best illustrated by some figures. In practice, I have found a relationship between the damping force and the load on the suspension device for optimum ride characteristics, and this damping force is a function of the pressure in annular chamber 94 and the pressure in rod chamber 134. Thus if we define the damping pressure, $P_D$, as the difference between the pressure in chambers 94 and 134, we get a formula (1) $$P_D = P_A - P_2$$

where $P_D$ is the damping pressure
$P_A$ is the pressure in chamber 94 and $P_2$ is the pressure in chamber 134

Next, I define the damping force as (2) $$F_D = P_D \times A_A$$

where the new quantity, $A_A$, is the cross-sectional area of chamber 94 (or the area of surface 96). Thus the damping force, $F_D$, is a force which applies to the under side, area 96, of the piston and restrains the "bounce" or rebound. Now let $P_H$ = the pressure in chamber 92
$A_V$ = the area of the underside of element 154 exposed and responsive to $P_A$
$A_R$ = the area of rod or stem 160 and $F_S$ = the force of spring 156

The force applied to the underside of element 154 is $P_A \times A_V$. Before element 154 can be unseated, all forces acting on its lower surface must be greater than all the forces acting on its upper surface. Thus, the limiting conditions can be defined as (3) $$P_A \times A_V = F_S + P_H \times A_R + P_2 \times (A_V - A_R)$$

From Equation 1 above, $P_A = P_D + P_2$, whence (4) $$(P_D + P_2) \times A_V = F_S + P_H \times A_R + P_2 \times (A_V - A_R)$$

Simplifying, Equation 4 becomes (5) $$P_D \times A_V = F_S + (P_H - P_2) \times A_R$$

Now let it be assumed that the vehicle is loaded in such a way that each suspension device supports 10,000 pounds. If the device is charged to 200 p.s.i. (pounds per square inch) in chamber 94 and 600 p.s.i. in chamber 92, $A_A = 3.5$ square inches, $A_R = .05$ square inch, $A_V = .10$ square inch, and $F_S = 37$ pounds, then a force of 700 pounds pushes up on the piston and 10,700 pounds pushes down on the piston. With the system in equilibrium, $P_2$ is the same as $P_A$, or 200 p.s.i. Solving (5) above, for $P_D$, we get 570 p.s.i. From Equation 2, $F_D = 1995$ pounds or close to 20 percent of the load. Also, from the above relationships, it turns out that there is a net force of 77–20, or 57 pounds holding element 154 seated.

Unloaded, each device supports 3,000 pounds, with $P_H$ and $P_A$ being 300 and 700 p.s.i respectively, a force of 2,450 pounds pushes up on the piston and a force of 5,450 pounds pushes down. According to these values, $P_D$ comes to 170 p.s.i., and $F_D$ is 595 pounds, or, again, close to 20 percent of the load. In this case, there are 70 pounds pushing up on element 154, and 87 pounds pushing down, or a net of 17 pounds holding element 154 seated.

It will be noted from the above that there is a net force of 67 pounds holding element 154 seated when the vehicle is loaded, and a net of 17 pounds, vehicle unloaded. These values are within allowable limits. Moreover, it is desirable to have a greater force present when the vehicle is loaded, because at that time there is a greater "push" available above the piston to move the piston downward to unseat element 154. To show the advantages of the rebound control system of this invention, assume a system in which stem 160 is not exposed to $P_H$, but instead terminates in the counterbore so as to be exposed to $P_2$. In that case, under equilibrium conditions, the force holding the valve seated is the force of the spring, and is a constant, regardless of load. However, it must be remembered that the equilibrium conditions referred to hardly ever exist when the vehicle is in motion. Suppose that, with the structure shown, a wheel has just hit a severe bump so that $P_H$ is very high and $P_2$ has been reduced as the piston starts back down. Under the assumed dimensions, Equation 5 becomes (6) $$P_D \times A_V = F_S + .05(P_H - P_2)$$

which means that the spring gets a very substantial assist from $P_H$ acting through stem 160, and this is desirable to dampen the motion. If stem 160 did not project up through the piston, and instead were exposed only to $P_2$, element 154 would unseat too quickly and would not dampen the motion adequately. However, if spring 156 were made strong enough to provide adequate damping under those conditions, the force holding element 154 seated would be too high to keep the tire on the ground with piston 76 near the lower end of its travel. This same difficulty would exist when the vehicle ran empty.

As an example of the "severe bump" just referred to, suppose that a 2 g. load has been thus imposed on the device so that $P_H = 1200$ p.s.i. and $P_2 = 150$ p.s.i. Using (2) and (5) above, $P_D$ comes to 895 p.s.i. and $F_D$ to 3,130 pounds instead of 2,000 pounds. This extra 1,130 pounds of damping force is a "bonus" and results in improved ride characteristics.

From the examples given, those skilled in the art can visualize and fully understand other examples, from which it is evident that this invention provides a greatly improved suspension system having improved rebound control and ride characteristics.

It will be understood that the embodiments of the invention here shown are only illustrative and that other embodiments can be devised within the scope of the appended claims.

What is claimed is:

1. A suspension device for a vehicle comprising a cylinder having a bore closed at one end and open at its other end, a piston reciprocable in the cylinder bore and forming a head chamber and an annular chamber, a piston rod having an internal bore and secured to the piston to close the internal bore at one end and extending through the open end of the cylinder bore, cylinder closure means cooperating with the piston rod to close the open end of the cylinder bore, whereby the head chamber of the cylinder is axially limited by the closed end of the cylinder bore and one face of the piston, and the annular chamber is radially limited by the cylinder bore and the piston rod and is axially limited by the face of the piston opposite said one face and the cylinder closure means, a closure for the remaining end of the piston rod bore, a membrane dividing the piston rod bore into a first rod chamber and a second rod chamber and movable to vary the volume of said first and second rod chambers, a compressible fluid in the head chamber, an incompressible fluid in the annular chamber, a compressible fluid in the first rod chamber, an incompressible fluid in the second rod chamber, first fluid conduit means connecting the annular chamber and the second rod chamber, a check valve in said first fluid conduit means to permit fluid flow from the second rod chamber to the annular chamber, second fluid conduit means connecting the annular chamber and the second rod chamber, a second check valve in said second fluid conduit means to permit fluid flow from the annular chamber to the second rod chamber and responsive to pressure in the head chamber and to pressure in the annular chamber, and resilient means biasing the second check valve toward its closed position.

2. A suspension device for supporting static and dynamic loads comprising means defining first, second, and third chambers, said first chamber supporting said loads and charged with a compressible fluid, means responsive to the pressure in said first chamber, an incompressible fluid in said second and third chambers, first and second conduits connecting said second and third chambers, a first one-way flow control means in said first conduit permitting fluid flow only from said second chamber to said third chamber, said first one-way control means including said pressure responsive means, a second one-way flow control means in said second conduit permitting fluid flow only from said third chamber to said second chamber, said first flow control means being urged toward a closed position in response to forces exerted on said pressure responsive means by the compressible fluid in said first chamber and urged toward an open position in response to forces exerted on said first flow control means by the incompressible fluid in said second chamber, and spring means biasing said first flow control means toward its closed position with a constant force.

3. A suspension device for supporting static and dynamic loads comprising means defining first, second, and third chambers, said first chamber supporting said loads and charged with a compressible fluid, means responsive to the pressure in said first chamber, an incompressible fluid in said second and third chambers, first and second conduits connecting said second and third chambers, a first one-way flow control means in said first conduit permitting fluid flow only from said second chamber to said third chamber, said first one-way control means including said pressure responsive means, a second one-way flow control means in said second conduit permitting fluid flow only from said third chamber to said second chamber, said first flow control means being urged toward a closed position in response to forces exerted on said pressure responsive means by the compressible fluid in said first chamber, and spring means biasing said first flow control means toward its closed position with a constant force.

4. A suspension device for supporting static and dynamic loads comprising means defining first, second, and third variable volume chambers, said first chamber supporting said loads and charged with a compressible fluid, means responsive to the pressure in said first chamber, an incompressible fluid in said second and third chambers, first and second conduits connecting said second and third chambers, a first one-way flow control means in said first conduit permitting fluid flow only from said second chamber to said third chamber, said first one-way control means including said pressure responsive means, a second one-way flow control means in said second conduit permitting fluid flow only from said third chamber to said second chamber, said first flow control means being urged toward a closed position in response to forces exerted on said pressure responsive means by the compressible fluid in said first chamber, means defining a fourth chamber and including a common movable wall with said third chamber, a compressible fluid in said fourth chamber, said movable wall being responsive to volumetric increase and decrease in said third chamber to vary the relative volumes in said third and fourth chambers.

5. A suspension device for supporting static and dynamic loads comprising means defining first, second, and third variable volume chambers, said first chamber supporting said loads and charged with a compressible fluid, means responsive to the pressure in said first chamber, an incompressible fluid in said second and third chambers, first and second conduits connecting said second and third chambers, a first one-way flow control means in said first conduit permitting fluid flow only from said second chamber to said third chamber, said first one-way control means including said pressure responsive means, a second one-way flow control means in said second conduit permitting fluid flow only from said third chamber to said second chamber, said first flow control means being urged toward a closed position in response to forces exerted on said pressure responsive means by the compressible fluid in said first chamber and urged toward an open position in response to forces exerted on said first flow control means by the incompressible fluid in said second chamber, means defining a fourth chamber and including a common movable wall with said third chamber, a compressible fluid in said fourth chamber, said movable wall being responsive to volumetric increase and decrease in said third chamber to vary the relative volumes in said third and fourth chambers.

6. A suspension device for supporting static and dynamic loads comprising means defining first, second, and third variable volume chambers, said first chamber supporting said loads and charged with a compressible fluid, means responsive to the pressure in said first chamber, an incompressible fluid in said second and third chambers, first and second conduits connecting said second and third chambers, a first one-way flow control means in said first conduit permitting fluid flow only from said second chamber to said third chamber, said first one-way control means including said pressure responsive means, a second one-way flow control means in said second conduit permitting fluid flow only from said third chamber to said second chamber, said first flow control means being urged toward a closed position in response to forces exerted on said pressure responsive means by the compressible fluid in said first chamber and urged toward an open position in response to forces exerted on said first flow control means by the incompressible fluid in said second chamber, spring means biasing said first flow control means toward its closed position with a constant force, means defining a fourth chamber and including a common movable wall with said third chamber, an incompressible fluid in said fourth chamber, said movable wall being responsive to volumetric increase and decrease in said third chamber to vary the relative volumes in said third and fourth chambers.

7. A suspension device for supporting static and dynamic loads comprising means defining first, second, and third variable volume chambers, said first chamber supporting said loads and charged with a compressible fluid, means responsive to the pressure in said first chamber, an incompressible fluid in said second and third chambers, first and second conduits connecting said second and third chambers, a first one-way flow control means in said first conduit permitting fluid flow only from said second chamber to said third chamber, said first one-way control means including said pressure responsive means, a second one-way flow control means in said second conduit permitting fluid flow only from said third chamber to said second chamber, said first flow control means being urged toward a closed position in response to forces exerted on said pressure responsive means by the compressible fluid in said first chamber, and spring means biasing said first flow control means toward its closed position with a constant force, means defining a fourth chamber and including a common movable wall with said third chamber, a compressible fluid in said fourth chamber, said movable wall being responsive to volumetric increase and decrease in said third chamber to vary the relative volumes in said third and fourth chambers.

8. A suspension device for supporting static and dynamic loads comprising means defining first, second, and third variable volume chambers, said first chamber supporting said loads and charged with a compressible fluid, means responsive to the pressure in said first chamber, an incompressible fluid in said second and third chambers, first and second conduits connecting said second and third chambers, a first one-way flow control means in said first conduit permitting fluid flow only from said second chamber to said third chamber, said first one-way control means including said pressure responsive means, a second one-way flow control means in said second conduit permitting fluid flow only from said third chamber to said second chamber, said first flow control means being urged toward a closed position in response to forces exerted on said pressure responsive means by the compressible fluid in said first chamber and in response to forces exerted by the incompressible fluid in said third chamber on said first flow control means and being urged toward an open position in response to forces exerted on said first flow control means by the incompressible fluid in said second chamber, and spring means biasing said first flow control means toward its closed position with a constant force.

9. A suspension device for supporting static and dynamic loads comprising means defining first, second, and third variable volume chambers, said first chamber supporting said loads and charged with a compressible fluid, means responsive to the pressure in said first chamber, an incompressible fluid in said second and third chambers, first and second conduits connecting said second and third chambers, a first one-way flow control means in said first conduit permitting fluid flow only from said second chamber to said third chamber, said first one-way control means including said pressure responsive means, a second one-way flow control means in said second conduit permitting fluid flow only from said third chamber to said second chamber, said first flow control means being urged toward a closed position in response to forces exerted on said pressure responsive means by the compressible fluid in said first chamber and in response to forces exerted by the incompressible fluid in said third chamber on said first flow control means, and spring means biasing said first flow control means toward its closed position with a constant force.

10. A suspension device for supporting static and dynamic loads comprising means defining first, second, and third variable volume chambers, said first chamber supporting said loads and charged with a compressible fluid, means responsive to the pressure in said first chamber, an incompressible fluid in said second and third chambers, first and second conduits connecting said second and third chambers, a first one-way flow control means in said first conduit permitting fluid flow only from said second chamber to said third chamber, said first one-way control means including said pressure responsive means, a second one-way flow control means in said second conduit permitting fluid flow only from said third chamber to said second chamber, said first flow control means being urged toward a closed position in response to forces exerted on said pressure responsive means by the compressible fluid in said first chamber and in response to forces exerted by the incompressible fluid in said third chamber on said first flow control means, means defining a fourth chamber and including a common movable wall with said third chamber, a compressible fluid in said fourth chamber, said movable wall being responsive to volumetric increase and decrease in said third chamber to vary the relative volumes in said third and fourth chambers.

11. A suspension device for supporting static and dynamic loads comprising means defining first, second, and third variable volume chambers, said first chamber supporting said loads and charged with a compressible fluid, means responsive to the pressure in said first chamber, an incompressible fluid in said second and third chambers, first and second conduits connecting said second and third chambers, a first one-way flow control means in said first conduit permitting fluid flow only from said second chamber to said third chamber, said first one-way control means including said pressure responsive means, a second one-way flow control means in said second conduit permitting fluid flow only from said third chamber to said second chamber, said first flow control means being urged toward a closed position in response to forces exerted on said pressure responsive means by the compressible fluid in said first chamber and in response to forces exerted by the incompressible fluid in said third chamber on said first flow control means and urged toward an open position in response to forces exerted on said first flow control means by the incompressible fluid in said second chamber, means defining a fourth chamber and including a common movable wall with said third chamber, a compressible fluid in said fourth chamber, said movable wall being responsive to volumetric increase and decrease in said third chamber to vary the relative volumes in said third and fourth chambers.

12. A suspension device for supporting static and dynamic loads comprising means defining first, second, and third variable volume chambers, said first chamber supporting said loads and charged with a compressible fluid, means responsive to the pressure in said first chamber, an incompressible fluid in said second and third chambers, first and second conduits connecting said second and third chambers, a first one-way flow control means in said first conduit permitting fluid flow only from said second chamber to said third chamber, said first one-way control means including said pressure responsive means, a second one-way flow control means in said second conduit permitting fluid flow only from said third chamber to said second chamber, said first flow control means being urged toward a closed position in response to forces exerted on said pressure responsive means by the compressible fluid in said first chamber and in response to forces exerted by the incompressible fluid in said third chamber on said first flow control means and urged toward an open position in response to forces exerted on said first flow control means by the incompressible fluid in said second chamber, spring means biasing said first flow control means toward its closed position with a constant force, means defining a fourth chamber and including a common movable wall with said third chamber, a compressible fluid in said fourth chamber, said movable wall being responsive to volumetric increase and decrease in said third chamber to vary the relative volumes in said third and fourth chambers.

13. A suspension device for supporting static and dynamic loads comprising means defining first, second, and third variable volume chambers, said first chamber supporting said loads and charged with a compressible fluid, means responsive to the pressure in said first chamber, an incompressible fluid in said second and third chambers, first and second conduits connecting said second and third chambers, a first one-way flow control means in said first conduit permitting fluid flow only from said second chamber to said third chamber, said first one-way control means including said pressure responsive means, a second one-way flow control means in said second conduit permitting fluid flow only from said third chamber to said second chamber, said first flow control means being urged toward a closed position in response to forces exerted on said pressure responsive means by the compressible fluid in said first chamber and in response to forces exerted by the incompressible fluid in said third chamber on said first flow control means, spring means biasing said first flow control means toward its closed position with a constant force, means defining a fourth chamber and including a common movable wall with said third chamber, a compressible fluid in said fourth chamber, said movable wall being responsive to volume increase and decrease in said third chamber to vary the relative volumes in said third and fourth chambers.

14. A suspension device for supporting static and dynamic loads comprising means defining first, second, and third chambers, said first chamber supporting said loads and charged with a compressible fluid, means responsive to the pressure in said first chamber, an incompressible fluid in said second and third chambers, first and second conduits connecting said second and third chambers, a first one-way flow control means in said first conduit permitting fluid flow only from said second chamber to said third chamber and providing guide means, said first one-way control means including said pressure responsive means, a second one-way flow control means in said second conduit permitting fluid flow only from said third chamber to said second chamber and movable along a path determined by said guide means, said first flow control means being urged toward a closed position in response to forces exerted on said pressure responsive means by the compressible fluid in said first chamber.

15. A suspension device for a vehicle comprising a cylinder having a bore therein, said bore defining a substantially closed chamber within said cylinder, means slidably mounted in said bore and dividing said closed chamber into a first chamber and a second chamber, first and second conduits connecting said second chamber to a third chamber, a compressible fluid in said first chamber, an incompressible fluid in said second and third chambers, said slidably mounted means being responsive to loads applied to said suspension device to change the volume of said first chamber and the pressure of the fluid contained therein and to proportionately change the volume of the second chamber and the volume of the fluid contained therein, means responsive to the pressure in said first chamber, a first one-way flow control means in said first conduit permitting fluid flow only from said second chamber to said third chamber, said one-way flow control means including said pressure responsive means, a second one-way flow control means in said second conduit permitting fluid flow only from said third chamber to said second chamber, said first flow control means being urged toward a closed position in response to forces exerted on said pressure responsive means by the compressible fluid in said first chamber.

16. A suspension device for a vehicle comprising a cylinder having a bore therein, said bore defining a substantially closed chamber within said cylinder, means slidably mounted in said bore and dividing said closed chamber into a first chamber and a second chamber, first and second conduits connecting said second chamber to a third chamber, a compressible fluid in said first chamber, an incompressible fluid in said second and third chambers, said slidably mounted means being responsive to loads applied to said suspension device to change the volume of said first chamber and the pressure of the fluid contained therein and to proportionately change the volume of the second chamber and the volume of the fluid contained therein, means responsive to the pressure in said first chamber, a first one-way flow control means in said first conduit permitting fluid flow only from said second chamber to said third chamber, said one-way control means including said pressure responsive means, a second one-way flow control means in said second conduit permitting fluid flow only from said third chamber to said second chamber, said first flow control means being urged toward a closed position in response to forces exerted on said pressure responsive means by the compressible fluid in said first chamber, and spring means biasing said first flow control means toward its closed position with a constant force.

17. A suspension device for a vehicle comprising a cylinder having a bore therein, said bore defining a substantially closed chamber within said cylinder, means slidably mounted in said bore and dividing said closed chamber into a first chamber and a second chamber, first and second conduits connecting said second chamber to a third chamber, a compressible fluid in said first chamber, an incompressible fluid in said second and third chambers, said slidably mounted means being responsive to loads applied to said suspension device to change the volume of said first chamber and the pressure of the fluid contained therein and to proportionately change the volume of the second chamber and the volume of the fluid contained therein, means responsive to the pressure in said first chamber, a first one-way control means in said first conduit permitting fluid flow only from said second chamber to said third chamber, said one-way flow control means including said pressure responsive means, a second one-way control means in said second conduit permitting fluid flow only from said third chamber to said second chamber, said first flow control means being urged toward a closed position in response to forces exerted on said pressure responsive means by the compressible fluid in said first chamber and urged toward an open position in response to forces exerted on said first flow control means by the incompressible fluid in said second chamber, and spring means biasing said first flow control means towards its closed position with a constant force.

18. A suspension device for a vehicle comprising a cylinder having a bore therein, said bore defining a substantially closed chamber within said cylinder, means slidably mounted in said bore and dividing said closed chamber into a first chamber and a second chamber, first and second conduits connecting said second chamber to a third chamber, a compressible fluid in said first chamber, an incompressible fluid in said second and third chambers, said slidably mounted means being responsive to loads applied to said suspension device to change the volume of said first chamber and the pressure of the fluid contained therein and to proportionately change the volume of the second chamber and the volume of the fluid contained therein, means responsive to the pressure in said first chamber, a first one-way flow control means in said first conduit permitting fluid flow only from said second chamber to said third chamber, said one-way control means including said pressure responsive means, a second one-way flow control means in said second conduit permitting fluid flow only from said third chamber to said second chamber, said first flow control means being urged toward a closed position in response to forces exerted on said pressure responsive means by the compressible fluid in said first chamber and in response to forces exerted by the incompressible fluid in said third chamber on said first flow control means and being urged toward an open position in response to forces exerted on said first flow control means by the incompressible fluid in said second chamber, and spring means biasing said first flow control means towards its closed position with a constant force.

References Cited in the file of this patent
UNITED STATES PATENTS

| | | |
|---|---|---|
| 2,564,790 | Orloff et al. | Apr. 21, 1951 |
| 2,570,362 | Mercier | Oct. 9, 1951 |
| 2,982,538 | Bourcier de Carbon | May 2, 1961 |
| 3,036,844 | Vogel | May 29, 1962 |